(No Model.)
J. T. THOMPSON.
RAKE.
No. 486,361. Patented Nov. 15, 1892.
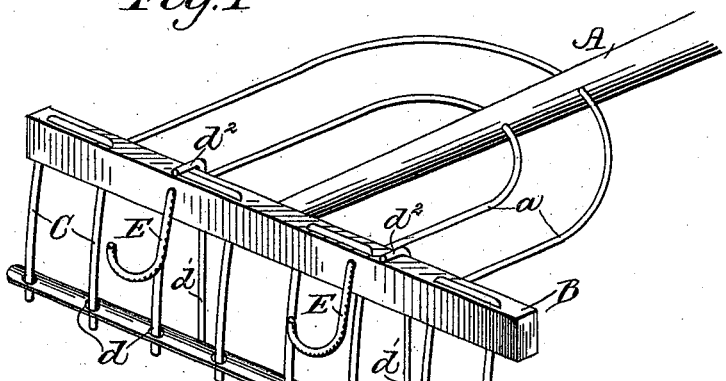
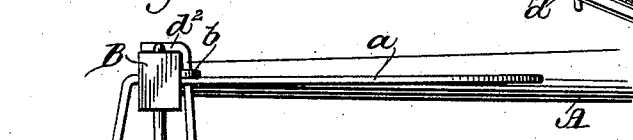
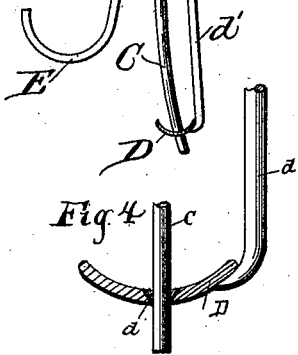
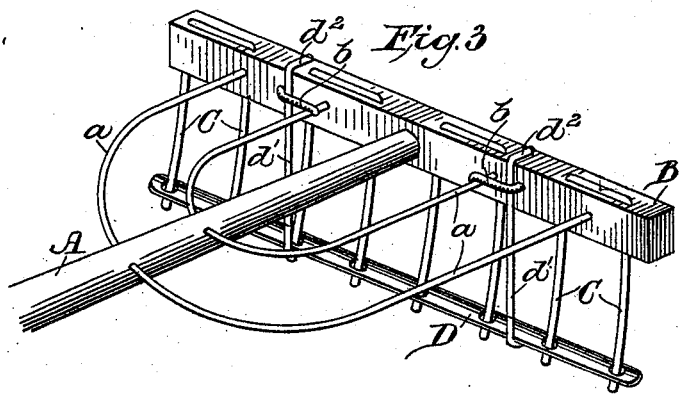
Witnesses
C. M. Gallaher
J. Edgar Smith
Inventor
Joseph T. Thompson
By his Attorneys,
C. A. Snow & Co.

UNITED STATES PATENT OFFICE.

JOSEPH T. THOMPSON, OF ONEIDA, NEW YORK.

RAKE.

SPECIFICATION forming part of Letters Patent No. 486,361, dated November 15, 1892.

Application filed February 24, 1891. Serial No. 382,578. (No model.)

*To all whom it may concern:*

Be it known that I, JOSEPH T. THOMPSON, a citizen of the United States, residing at Oneida, in the county of Madison and State of New York, have invented a new and useful Rake, of which the following is a specification.

This invention is an improvement in rakes, and has for its objects to provide a rake with a self-cleaning attachment which may readily be fastened thereto or removed therefrom, and to provide a rake with guide or rest pieces, whereby the main weight of the same will be supported, and thus prevent the points of the tines from digging into the ground and making the grass appear ragged.

The invention has further objects in the general improvement of rakes and the improvement of their effectiveness.

With these objects in view the invention resides in the various novel details of construction and in the combination of parts hereinafter fully described, and pointed out in the claims.

In the drawings, in which I have illustrated my invention, and in which like letters of reference indicate corresponding parts, Figure 1 is a perspective view of my improved rake with its attachments. Fig. 2 is a side elevation of the same. Fig. 3 is a view in perspective showing the device from the rear. Fig. 4 is a detail sectional view, on an enlarged scale, of the cleaning-strip and adjacent parts.

In the drawings the letter A designates the ordinary handle to a rake, and B a rake-head of the ordinary construction.

C indicates the rake teeth or tines, which may be of any usual or convenient shape, but which by preference are, as shown in the drawings, curved spring-wires bent into U shape and the free ends passed through the rake-head B, where they are secured, thus making the teeth stronger and firmer in place than single teeth.

D indicates my improved cleaning-strip, which is made of metal, perforated in order to allow it to have free play upon the tines C. These perforations are indicated by the letter $d$. This strip of metal D is by preference thin and light, and in order to increase its strength and to enable it to ride easily upon the grass it is curved in cross-section, the convex portion being lowermost. The cleaning-strip D has fastened to it the bars $d'$, which at their upper ends are bent rearwardly over the rake-head, for a purpose to be described.

Upon the rake-head B are pivoted latches $b$, which are adapted to be turned down over one of the braces $a$ near the rake-head B in order to inclose and confine the bars $d'$, which when thus inclosed are allowed vertical play, but are restrained from allowing the strip D to escape from the tines by the forwardly-bent upper ends $d^2$ resting upon the rake-head.

Upon the back side of the rake-head B are fastened curved guards or rests E, which may be formed by continuing the ends of the braces $a$, as is shown in the drawings, or which may be independently attached to the rake-head. The use of these guards is to rest the weight of the rake upon when gathering leaves or grass. The rake is supported by these guards, the tines of the rake being guided a fraction of an inch above the surface of the ground. In this manner all tearing of the grass, the roots, or digging into the ground itself is prevented and the labor of raking is much reduced.

The cleaning-strip D is, as described, curved, as seen in cross-section, and is provided with the perforations $d$. In order to render these perforations the more effective in cleaning the tines of all refuse, dirt, and the like, the upper sides of the perforations are countersunk in order to provide a sharp cutting-edge on the under side. This arrangement not only enables the cleaning-strip to scrape the tines better than if the holes were bored straight through, but it also aids in enabling the cleaning-strip itself to be cleared of the dirt and trash which tend to clog it, and especially which tend to clog the perforations.

While I have described my cleaning-strip as I usually construct it, I do not desire to be limited to its precise features, nor do I wish to be limited to the construction of my guards or rests E which is shown in the drawings. It will be evident that there are many details of construction and arrangement of parts which may be changed without altering the character of my invention.

I am aware that guards have been adjustably mounted on the end rake-teeth and provided with a rearwardly-turned foot and that they have been secured to and depend from the head of a rake in a manner similar to the rake-teeth and have been extended below the rake-teeth; but I am not aware that they have been secured to the rake-head and arranged in the rear of and above the rake-teeth and curved rearwardly and upwardly.

Having thus fully described my invention, what I claim as new, and desire to secure by Letters Patent, is—

1. The combination, with a rake-head provided with braces $a$ and pivoted latches $b$, adapted to be turned down over the said braces near the rake-head, of a cleaning-strip D, provided with perforations which are adapted to receive the tines of the rake, the said cleaning-strip being provided with bars $d'$, which are passed vertically between the latches and the rake-head and have their upper ends $d^2$ forwardly bent and adapted to rest upon the top of the rake-head B, all substantially as and for the purpose set forth.

2. A rake provided with the guards E, constructed of wire and secured to and projecting rearwardly from the back of the rake-head and arranged in rear of and above the rake-teeth and extending downward and curving outward and upward, thereby adapted to support the rake-teeth at a suitable distance above the ground, substantially as described.

3. The combination, with a rake, of a cleaning-strip having perforations to receive the rake-teeth, said perforations being countersunk at the upper face of the strip to provide cutting-edges, substantially as described.

4. The combination, with a rake, of a cleaning-strip having perforations to receive the rake-teeth, upwardly-extending arms bent over the rake-head, and guides secured to the rake-head and receiving through them the said arms, substantially as and for the purpose set forth.

5. The combination of a rake comprising a rake-head, a handle, braces extending from the handle to the rake-head and rake-teeth, a cleaning-bar having perforations to receive the rake-teeth and provided with upwardly-extending arms having their upper ends loosely resting upon the rake-head, and the latches pivotally mounted on the front of the rake-head and engaging the adjacent braces and forming guides for the arms, substantially as described.

6. In a rake, the combination of a rake head, a handle, rake-teeth, and a continuous brace arranged on both sides of the handle and extending through the same and also through the rake-head and extending downward from the back of the latter and forming guards curved outward and upward, substantially as described.

7. A rake provided with the brace extending through the handle and arranged on opposite sides of the same and passing through the rake-head and terminating in hook-shaped guides arranged in rear of and above the rake-teeth, said guides forming abrupt downward bends and securing the rake-head in position, substantially as described.

In testimony that I claim the foregoing as my own I have hereto affixed my signature in presence of two witnesses.

JOSEPH T. THOMPSON.

Witnesses:
  CHAS. H. HARD,
  HENRY D. HARD.